US011460679B2

(12) United States Patent
Yamazaki

(10) Patent No.: US 11,460,679 B2
(45) Date of Patent: Oct. 4, 2022

(54) IMAGING LENS

(71) Applicant: TOKYO VISIONARY OPTICS CO., LTD., Tokyo (JP)

(72) Inventor: Kaoru Yamazaki, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 176 days.

(21) Appl. No.: 16/376,299

(22) Filed: Apr. 5, 2019

(65) Prior Publication Data
US 2020/0073084 A1 Mar. 5, 2020

(30) Foreign Application Priority Data

Apr. 5, 2018 (JP) .............................. JP2018-072933

(51) Int. Cl.
*G02B 15/14* (2006.01)
*G02B 9/60* (2006.01)
*G02B 13/00* (2006.01)
*G02B 13/06* (2006.01)

(52) U.S. Cl.
CPC ............ *G02B 15/145* (2019.08); *G02B 9/60* (2013.01); *G02B 15/1455* (2019.08); *G02B 13/0045* (2013.01); *G02B 13/06* (2013.01); *G02B 15/145513* (2019.08)

(58) Field of Classification Search
CPC .... G02B 15/145; G02B 15/1455; G02B 9/60; G02B 15/145513; G02B 13/06; G02B 13/0045; G02B 15/14; G02B 15/15; G02B 15/155; G02B 15/16; G02B 15/163; G02B 15/167; G02B 15/177; G02B 15/20
USPC ...................................................... 359/714
See application file for complete search history.

(56) References Cited

U.S. PATENT DOCUMENTS

| 9,715,089 B1 | 7/2017 | Yan et al. |
| 2012/0170142 A1* | 7/2012 | Hsieh ...................... G02B 9/62 |
| | | 359/762 |
| 2014/0118846 A1* | 5/2014 | Kubota .................. G02B 13/06 |
| | | 359/714 |

(Continued)

FOREIGN PATENT DOCUMENTS

| JP | 2017-134224 | 8/2017 | |
| TW | I633361 B * | 8/2018 | ........... G02B 13/006 |
| WO | WO-2017086051 A1 * | 5/2017 | ............. G02B 13/04 |

*Primary Examiner* — George G. King
(74) *Attorney, Agent, or Firm* — Hamre, Schumann, Mueller & Larson, P.C.

(57) ABSTRACT

There is provided an imaging lens with high-resolution which satisfies demand of wide field of view, low-profileness and low F-number in well balance, and excellently corrects aberrations. An imaging lens comprises, in order from an object side to an image side, a first lens, a second lens having negative refractive power near the optical axis, a third lens having a convex surface facing the image side near the optical axis, a fourth lens and a fifth lens, wherein said first lens has negative refractive power near the optical axis, an image-side surface of said fifth lens has a convex surface facing the image side near the optical axis, and below conditional expressions are satisfied:

3.00<(T4/f)×100<5.90

0.40<f2/f5<1.45 where
T4: a distance along the optical axis from the image-side surface of the fourth lens to the object-side surface of the fifth lens, (Continued)

f: a focal length of the overall optical system of the imaging lens,
f2: a focal length of the second lens,
f5: a focal length of the fifth lens.

17 Claims, 8 Drawing Sheets

(56) References Cited

U.S. PATENT DOCUMENTS

| | | | |
|---|---|---|---|
| 2014/0240853 A1* | 8/2014 | Kubota | G02B 13/18 |
| | | | 359/714 |
| 2016/0377833 A1* | 12/2016 | Liu | G02B 13/04 |
| | | | 359/714 |
| 2018/0149834 A1* | 5/2018 | Chiu | G02B 9/62 |
| 2018/0341089 A1* | 11/2018 | Nakamura | G02B 9/62 |
| 2019/0146186 A1* | 5/2019 | Liao | G02B 13/006 |
| | | | 359/714 |

* cited by examiner

IMAGING LENS

The present application is based on and claims priority of a Japanese patent application No. 2018-072933 filed on Apr. 5, 2018, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly to an imaging lens which is built in an imaging device mounted in an increasingly compact and high-performance smartphone and mobile phone, an information terminal such as a PDA (Personal Digital Assistant), a game console, PC and a robot, and moreover, a home appliance with camera function, a monitoring camera and an automobile.

Description of the Related Art

In recent years, it becomes common that camera function is mounted in the home appliance, the information terminal equipment, the automobile and public transportation. Furthermore, the image sensor of the imaging device such as the monitoring camera and an on-vehicle camera becomes increasingly compact and large in pixel year after year, and the imaging lens is also required to be compact and to have high performance accordingly.

Demand of wide field of view such as a field of view of 180 degrees or more is increased for the imaging lens used in the monitoring camera and the on-vehicle camera. Furthermore, the brighter imaging lens is demanded in accordance with pixel enhancement.

For Example, as a conventional imaging lens aiming the wide field of view and the high performance, the imaging lens disclosed in the following Patent Document 1 has been known.

Patent Document 1 (JP2017-134224A) discloses an imaging lens comprising, in order from an object side, a first lens having positive refractive power, a second lens having negative refractive power, a third lens, a fourth lens having the positive refractive power, and a fifth lens having the negative refractive power.

SUMMARY OF THE INVENTION

However, in lens configurations disclosed in the Patent Document 1, when wide field of view and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, "a convex surface", "a concave surface" or "a plane surface" of lens surfaces implies that a shape of the lens surface at paraxial portion (near an optical axis). "Refractive power" implies the refractive power near the optical axis. "A pole point" implies an off-axial point on an aspheric surface at which a tangential plane intersects the optical axis perpendicularly. "Total track length" is defined as a distance along the optical axis from an object-side surface of an optical element located closest to the object to an image plane. Thickness of an IR cut filter or a cover glass which may be arranged between the imaging lens and the image plane is converted into an air-converted distance.

An imaging lens according to the present invention comprises, in order from an object side to an image side, a first lens, a second lens having negative refractive power near the optical axis, a third lens having a convex surface facing the image side near the optical axis, a fourth lens, and a fifth lens.

According to the imaging lens having the above-described configuration, the first lens achieves wide field of view by strengthening the refractive power. The second lens controls light ray incident angle to the third lens to be small and properly corrects astigmatism and field curvature. The third lens has a convex surface facing the image side near the optical axis, and appropriately controls the light ray incident angle to the image-side surface of the third lens and properly corrects the astigmatism, the field curvature and distortion. The fourth lens maintains low-profileness and properly corrects spherical aberration and chromatic aberration. The fifth lens properly corrects the chromatic aberration, the astigmatism, the field curvature and the distortion.

According to the imaging lens having the above-described configuration, it is preferable that refractive power near the optical axis of the first lens is negative.

When the first lens has the negative refractive power, it is advantageous to wide field of view.

According to the imaging lens having the above-described configuration, it is preferable that an object-side surface of the second lens has a convex surface facing the object side near the optical axis.

When the object-side surface of the second lens has a convex surface facing the object side near the optical axis, coma aberration and the field curvature can be properly corrected.

According to the imaging lens having the above-described configuration, it is preferable that an object-side surface of the fifth lens has a concave surface facing the object side near the optical axis.

When the object-side surface of the fifth lens has a concave surface facing the object side near the optical axis, the coma aberration, the astigmatism and the field curvature can be properly corrected.

According to the imaging lens having the above-described configuration, it is preferable that an image-side surface of the fifth lens has a convex surface facing the image side near the optical axis.

When the image-side surface of the fifth lens has a convex surface facing the image side near the optical axis, the light ray incident angle to the image-side surface of the fifth lens is appropriately controlled, and the astigmatism, the field curvature and the distortion can be properly corrected.

According to the imaging lens having the above-described configuration, it is preferable that an image-side surface of the fifth lens is formed as an aspheric surface having at least one off-axial pole point.

When the image-side surface of the fifth lens is formed as the aspheric surface having at least one off-axial pole point, the field curvature and the distortion can be properly corrected.

According to the imaging lens having the above-described configuration, it is preferable that a below conditional expression (1) is satisfied:

$$3.00 < (T4/f) \times 100 < 5.90 \quad (1)$$

where

T4: a distance along the optical axis from the image-side surface of the fourth lens to the object-side surface of the fifth lens, f: a focal length of the overall optical system of the imaging lens.

The conditional expression (1) defines an appropriate range of a distance along the optical axis between the fourth lens and the fifth lens. By satisfying the conditional expression (1), the coma aberration and the astigmatism can be properly corrected.

According to the imaging lens having the above-described configuration, it is preferable that a below conditional expression (2) is satisfied:

$$0.40 < f2/f5 < 1.45 \quad (2)$$

where f2: a focal length of the second lens, f5: a focal length of the fifth lens.

When the fifth lens has the negative refractive power, the chromatic aberration can be properly corrected while securing back focus. Furthermore, the conditional expression (2) defines an appropriate range of the refractive power of the second lens and the fifth lens. By satisfying the conditional expression (2), the negative refractive power can be appropriately balanced against the second lens and the fifth lens. As a result, the astigmatism, the field curvature and the distortion can be properly corrected while achieving the wide field of view.

According to the imaging lens having the above-described configuration, it is preferable that a below conditional expression (3) is satisfied:

$$1.60 < T1/f < 3.70 \quad (3)$$

where

T1: a distance along the optical axis from the image-side surface of the first lens to the object-side surface of the second lens, f: a focal length of the overall optical system of the imaging lens.

The conditional expression (3) defines an appropriate range of a distance along the optical axis between the first lens and the second lens. By satisfying the conditional expression (3), the astigmatism and the field curvature can be properly corrected.

According to the imaging lens having the above-described configuration, it is preferable that a below conditional expression (4) is satisfied:

$$0.10 < T2/T3 < 0.80 \quad (4)$$

where

T2: a distance along the optical axis from the image-side surface of the second lens to the object-side surface of the third lens, T3: a distance along the optical axis from the image-side surface of the third lens to the object-side surface of the fourth lens.

The conditional expression (4) defines an appropriate range of a distance between the second lens and the third lens and a distance between the third lens and the fourth lens. By satisfying the conditional expression (4), difference of the distance between the second lens and the third lens and the distance between the third lens and the fourth lens is suppressed from being large, and the low-profileness is achieved. Furthermore, by satisfying the conditional expression (4), the third lens is arranged at an optimum position, and aberration correction function of the lens becomes more effective.

According to the imaging lens having the above-described configuration, it is preferable that a below conditional expression (5) is satisfied:

$$-19.5 < (D5/f5) \times 100 < -9.00 \quad (5)$$

where

D5: a thickness along the optical axis of the fifth lens, f5: a focal length of the fifth lens.

The conditional expression (5) defines an appropriate range of a thickness along the optical axis of the fifth lens. When a value is below the upper limit of the conditional expression (5), the thickness along the optical axis of the fifth lens is suppressed from being too small, and formability of the lens becomes excellent. On the other hand, when the value is above the lower limit of the conditional expression (5), the thickness along the optical axis of the fifth lens is suppressed from being too large, and an air gap of the object side and the image side of the fifth lens can be easily secured. As a result, the low-profileness can be maintained.

According to the imaging lens having the above-described configuration, it is preferable that a below conditional expression (6) is satisfied:

$$0.30 < T2/f < 1.00 \quad (6)$$

where

T2: a distance along the optical axis from the image-side surface of the second lens to the object-side surface of the third lens, f: a focal length of the overall optical system of the imaging lens.

The conditional expression (6) defines an appropriate range of a distance along the optical axis between the second lens and the third lens. By satisfying the conditional expression (6), the field curvature and the distortion can be properly corrected.

According to the imaging lens having the above-described configuration, it is preferable that a below conditional expression (7) is satisfied:

$$1.50 < T1/T2 < 5.30 \quad (7)$$

where

T1: a distance along the optical axis from the image-side surface of the first lens to the object-side surface of the second lens, T2: a distance along the optical axis from the image-side surface of the second lens to the object-side surface of the third lens.

The conditional expression (7) defines an appropriate range of a distance between the first lens and the second lens and a distance between the second lens and the third lens. By satisfying the conditional expression (7), difference of the distance between the first lens and the second lens and the distance between the second lens and the third lens is suppressed from being large, and the low-profileness is achieved. Furthermore, by satisfying the conditional expression (7), the second lens is arranged at an optimum position, and aberration correction function of the lens becomes more effective.

According to the imaging lens having the above-described configuration, it is preferable that a below conditional expression (8) is satisfied:

$$1.20 < D1/D2 < 3.70 \quad (8)$$

where

D1: a thickness along the optical axis of the first lens,

D2: a thickness along the optical axis of the second lens.

The conditional expression (8) defines an appropriate range of the thickness along the optical axis of the first lens and the thickness along the optical axis of the second lens.

When a value is below the upper limit of the conditional expression (8), the field curvature can be properly corrected. On the other hand, when a value is above the lower limit of the conditional expression (8), the astigmatism and the distortion can be properly corrected.

According to the imaging lens having the above-described configuration, it is preferable that a below conditional expression (9) is satisfied:

$$12 < r3/f < 40 \qquad (9)$$

where
r3: a paraxial curvature radius of the object-side surface of the second lens,
f: a focal length of the overall optical system of the imaging lens.

The conditional expression (9) defines an appropriate range of the paraxial curvature radius of the object-side surface of the second lens. When the value is below the upper limit of the conditional expression (9), the astigmatism can be properly corrected. On the other hand, when the value is above the lower limit of the conditional expression (9), the distortion can be properly corrected.

According to the imaging lens having the above-described configuration, it is preferable that a below conditional expression (10) is satisfied:

$$6.50 < r5/f < 42.00 \qquad (10)$$

where
r5: a paraxial curvature radius of the object-side surface of the third lens,
f: a focal length of the overall optical system of the imaging lens.

The conditional expression (10) defines an appropriate range of the paraxial curvature radius of the object-side surface of the third lens. When the value is below the upper limit of the conditional expression (10), the astigmatism can be properly corrected. On the other hand, when the value is above the lower limit of the conditional expression (10), the field curvature and the distortion can be properly corrected.

According to the imaging lens having the above-described configuration, it is preferable that a below conditional expression (11) is satisfied:

$$-8.50 < r6/f < -2.00 \qquad (11)$$

where
r6: a paraxial curvature radius of the image-side surface of the third lens,
f: a focal length of the overall optical system of the imaging lens.

The conditional expression (11) defines an appropriate range of the paraxial curvature radius of the image-side surface of the third lens. When the value is below the upper limit of the conditional expression (11), the field curvature and the distortion can be properly corrected. On the other hand, when the value is above the lower limit of the conditional expression (11), the astigmatism can be properly corrected.

According to the imaging lens having the above-described configuration, it is preferable that a below conditional expression (12) is satisfied:

$$-62 < (D1/f1) \times 100 < -29 \qquad (12)$$

where
D1: a thickness along the optical axis of the first lens,
f1: a focal length of the first lens.

The conditional expression (12) defines an appropriate range of the thickness along the optical axis of the first lens. When a value is below the upper limit of the conditional expression (12), the thickness along the optical axis of the first lens is prevented from being too small, and formability of the lens becomes excellent. On the other hand, when the value is above the lower limit of the conditional expression (12), the thickness along the optical axis of the first lens is prevented from being too large, and an air gaps of the image side of the first lens can be easily secured. As a result, the low-profileness can be maintained.

According to the imaging lens having the above-described configuration, it is preferable that a below conditional expression (13) is satisfied:

$$8 < r3/r4 < 30 \qquad (13)$$

where
r3 a paraxial curvature radius of the object-side surface of the second lens, and
r4: a paraxial curvature radius of the image-side surface of the second lens.

The conditional expression (13) defines relationship between paraxial curvature radii of the object-side surface and the image-side surface of the second lens. By satisfying the conditional expression (13), the astigmatism and the distortion can be properly corrected.

According to the imaging lens having the above-described configuration, it is preferable that a below conditional expression (14) is satisfied:

$$-3.80 < r7/r8 < -1.00 \qquad (14)$$

where
r7: a paraxial curvature radius of the object-side surface of the fourth lens,
r8: a paraxial curvature radius of the image-side surface of the fourth lens.

The conditional expression (14) defines relationship between paraxial curvature radii of the object-side surface and the image-side surface of the fourth lens. By satisfying the conditional expression (14), refractive power on the object-side surface and the image-side is suppressed from being too large. As a result, proper aberration correction can be achieved. Furthermore, an effect to reduce sensitivity to manufacturing error is obtained.

According to the imaging lens having the above-described configuration, it is preferable that a below conditional expression (15) is satisfied:

$$-6.50 < f1/f < -1.80 \qquad (15)$$

where
f1: a focal length of the first lens,
f: a focal length of the overall optical system of the imaging lens.

The conditional expression (15) defines an appropriate range of the refractive power of the first lens. When a value is below the upper limit of the conditional expression (15), negative refractive power of the first lens becomes appropriate, and the spherical aberration can be properly corrected. Furthermore, it is advantageous to the low-profileness. On the other hand, when the value is above the lower limit of the conditional expression (15), it is advantageous to the wide field of view.

According to the imaging lens having the above-described configuration, it is preferable that a below conditional expression (16) is satisfied:

$$-4.50 < f2/f < -1.00 \qquad (16)$$

where
f2: a focal length of the second lens,
f: a focal length of the overall optical system of the imaging lens.

The conditional expression (16) defines an appropriate range of the refractive power of the second lens. When a value is below the upper limit of the conditional expression (16), negative refractive power of the second lens becomes appropriate and it is advantageous to the low-profileness.

According to the imaging lens having the above-described configuration, it is preferable that a below conditional expression (17) is satisfied:

$$-5.50 < f5/f < -1.50 \qquad (17)$$

where
f5: a focal length of the fifth lens,
f: a focal length of the overall optical system of the imaging lens.

The conditional expression (17) defines an appropriate range of the refractive power of the first lens. When a value is below the upper limit of the conditional expression (17), negative refractive power of the fifth lens becomes appropriate and it is advantageous to the low-profileness. On the other hand, when the value is above the lower limit of the conditional expression (17), the coma aberration and the field curvature can be properly corrected.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5 and 7 are schematic views of the imaging lenses in Examples 1 to 4 according to the embodiments of the present invention, respectively.

Figure 1:
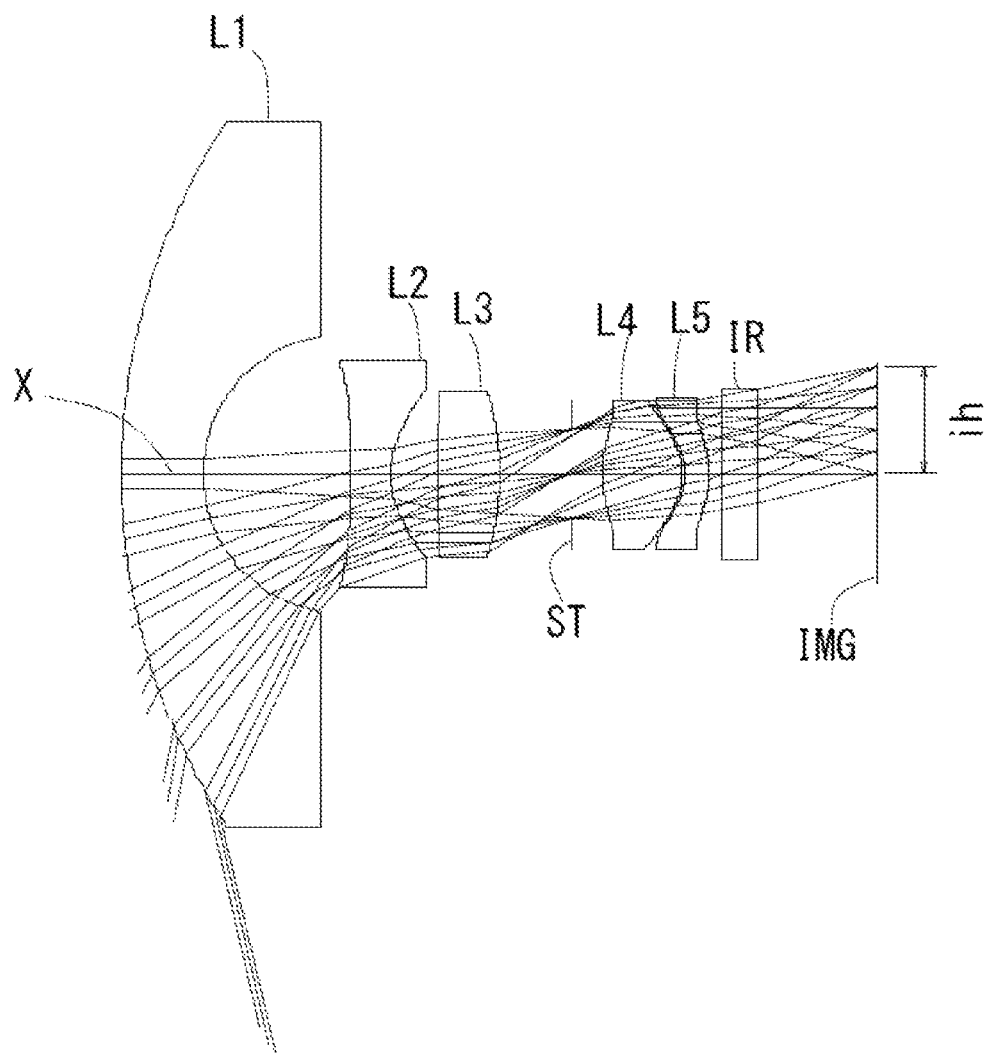
FIG. 1 is a schematic view showing a general configuration of an imaging lens in Example 1 according to the present invention.

As shown in FIG. 1, the imaging lens according to the present embodiment comprises, in order from an object side to an image side, a first lens L1, a second lens L2 having negative refractive power near the optical axis X, a third lens L3 having a convex surface facing the image side near the optical axis X, a fourth lens L4, and a fifth lens L5.

A filter IR such as an IR cut filter and a cover glass are arranged between the fifth lens L5 and an image plane IMG (namely, the image plane of an image sensor). The filter IR is omissible.

The first lens L1 achieves wide field of view by strengthening the refractive power. A shape of the first lens L1 is a meniscus shape having a convex surface facing the object side and a concave surface facing the image side near the optical axis X. Thereby, spherical aberration and distortion can be properly corrected.

The second lens L2 has a meniscus shape having a convex surface facing the object side and a concave surface facing the image side near the optical axis X. Thereby, the spherical aberration, coma aberration and field curvature can be properly corrected.

The third lens L3 has positive refractive power, and has a biconvex shape having convex surfaces facing the object side and the image side near the optical axis. Thereby, astigmatism, the field curvature and the distortion can be properly corrected.

An aperture stop ST is arranged between the third lens L3 and the fourth lens L4. By arranging the aperture stop ST between the third lens L3 and the fourth lens L4, downsizing in a radial direction can be achieved.

The fourth lens L4 has positive refractive power, and properly corrects the spherical aberration and chromatic aberration while maintaining low-profileness. A shape of the fourth lens L4 is a biconvex shape having convex surfaces facing the object side and the image side near the optical axis X, and the low-profileness can be achieved by positive refractive power on the object side and the image side. Furthermore, by providing the convex surfaces on both sides, curvature is suppressed from being large, and an effect to reduce sensitivity to manufacturing error is obtained.

The fifth lens L5 has negative refractive power and has a meniscus shape having a concave surface facing the object side and a convex surface facing the image side near the optical axis X. Thereby, the chromatic aberration, the coma aberration, the astigmatism, the field curvature and the distortion can be properly corrected.

An aspheric surface having at least one off-axial pole point is formed on the image side of the fifth lens L5, and the field curvature and the distortion can be properly corrected.

According to the present embodiments, each of the first lens L1 and the third lens L3 is a glass lens having spherical surfaces facing the object side and the image side. Glass material is small in change of optical characteristics with temperature. Therefore, even though the imaging lens according to the present embodiments is used in a wide temperature range from a lower temperature to a higher temperature, high quality of the lens can be maintained.

Regarding the lens material and lens surface, various selection can be made in accordance with usage environment or required performance, for example, either the glass material or a resin material, the spherical surface or the aspheric surface, and so on.

Regarding the imaging lens according to the present embodiments, all lenses are single lens. Configuration without a cemented lens can frequently use the aspheric surfaces, and aberrations can be easily corrected. In comparison with the case in which a cemented lens is used, workload is reduced, and manufacturing in low cost becomes available.

The imaging lens according to the present embodiments shows preferable effect by satisfying the below conditional expressions (1) to (17).

$$3.00 < (T4/f) \times 100 < 5.90 \qquad (1)$$

$$0.40 < f2/f5 < 1.45 \qquad (2)$$

$$1.60 < (T1/f) < 3.70 \qquad (3)$$

$$0.10 < T2/T3 < 0.80 \qquad (4)$$

$$-19.5 < (D5/f5) \times 100 < -9.00 \qquad (5)$$

$$0.30 < T2/f < 1.00 \qquad (6)$$

$$1.50 < T1/T2 < 5.30 \qquad (7)$$

$$1.20 < D1/D2 < 3.70 \qquad (8)$$

$$12 < r3/f < 40 \qquad (9)$$

$$6.50 < r5/f < 42.00 \qquad (10)$$

$$-8.50 < r6/f < -2.00 \qquad (11)$$

$$-62 < (D1/f1) \times 100 < -29 \qquad (12)$$

$$8 < r3/r4 < 30 \qquad (13)$$

$$-3.80 < r7/r8 < -1.00 \qquad (14)$$

$$-6.50 < f1/f < -1.80 \qquad (15)$$

$$-4.50 < f2/f < -1.00 \qquad (16)$$

$$-5.50 < f5/f < -1.50 \qquad (17)$$

Where
D1: a thickness along the optical axis X of the first lens L1,
D2: a thickness along the optical axis X of the second lens L2,
D5: a thickness along the optical axis X of the fifth lens L5,
T1: a distance along the optical axis X from the image-side surface of the first lens L1 to the object-side surface of the second lens L2,
T2: a distance along the optical axis X from the image-side surface of the second lens L2 to the object-side surface of the third lens L3,
T3: a distance along the optical axis X from the image-side surface of the third lens L3 to the object-side surface of the fourth lens L4,
T4: a distance along the optical axis X from the image-side surface of the fourth lens L4 to the object-side surface of the fifth lens L5,
f: a focal length of the overall optical system of the imaging lens,
f1: a focal length of the first lens L1,
f2: a focal length of the second lens L2,
f5: a focal length of the fifth lens L5,
r3: a paraxial curvature radius of the object-side surface of the second lens L2,
r4: a paraxial curvature radius of the image-side surface of the second lens L2,
r5: a paraxial curvature radius of the object-side surface of the third lens L3,
r6: a paraxial curvature radius of the image-side surface of the third lens L3,
r7: a paraxial curvature radius of the object-side surface of the fourth lens L4,
r8: a paraxial curvature radius of the image-side surface of the fourth lens L4.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (17a).

$$3.80 < (T4/f) \times 100 < 5.60 \qquad (1a)$$

$$0.60 < f2/f5 < 1.15 \qquad (2a)$$

$$1.90 < (T1/f) < 3.00 \qquad (3a)$$

$$0.30 < T2/T3 < 0.65 \qquad (4a)$$

$$-15.5 < (D5/f5) \times 100 < -10.00 \qquad (5a)$$

$$0.45 < T2/f < 0.85 \qquad (6a)$$

$$2.40 < T1/T2 < 4.40 \qquad (7a)$$

$$1.60 < D1/D2 < 3.10 \qquad (8a)$$

$$19 < r3/f < 33 \qquad (9a)$$

$$7.70 < r5/f < 35.00 \qquad (10a)$$

$$-7.00 < r6/f < -3.20 \qquad (11a)$$

$$-52 < (D1/f1) \times 100 < -31 \qquad (12a)$$

$$13 < r3/r4 < 25 \qquad (13a)$$

$$-3.10 < r7/r8 < -1.60 \qquad (14a)$$

$$-5.20 < f1/f < -2.80 \qquad (15a)$$

$$-3.50 < f2/f < -2.00 \qquad (16a)$$

$$-4.50 < f5/f < -2.30 \qquad (17a)$$

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14 and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \qquad \text{Equation 1}$$

Next, examples of the imaging lens according to this embodiment will be explained. In each example, f denotes the focal length of the overall optical system of the imaging lens, Fno denotes an F-number, ω denotes a half field of view, ih denotes a maximum image height, and TTL denotes a total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

The imaging lens in Example 1 satisfies conditional expressions (1) to (17) as shown in Table 5.

Figure 2:
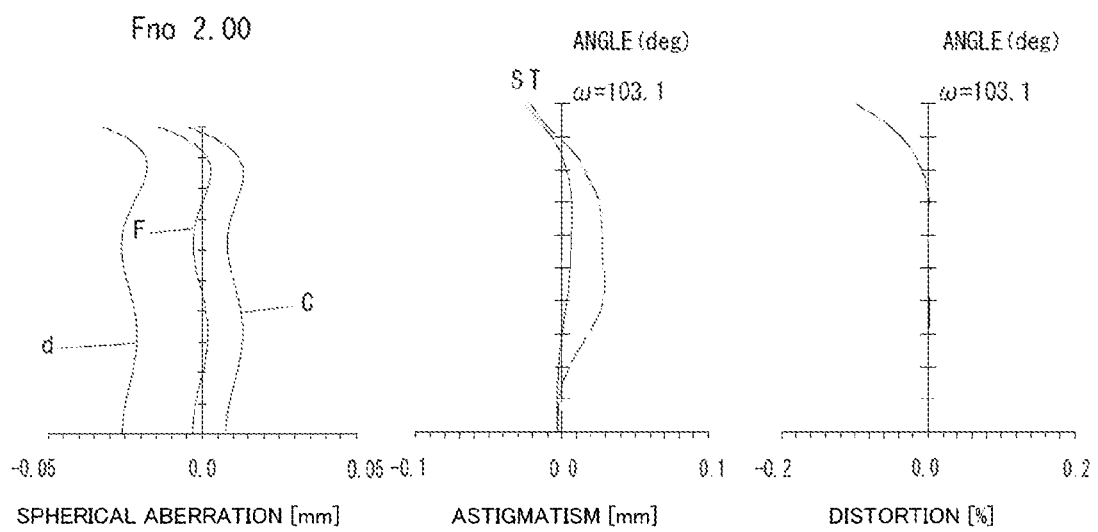
FIG. 2 shows spherical aberration, astigmatism, and distortion of the imaging lens in Example 1 according to the present invention.
Figure 3:
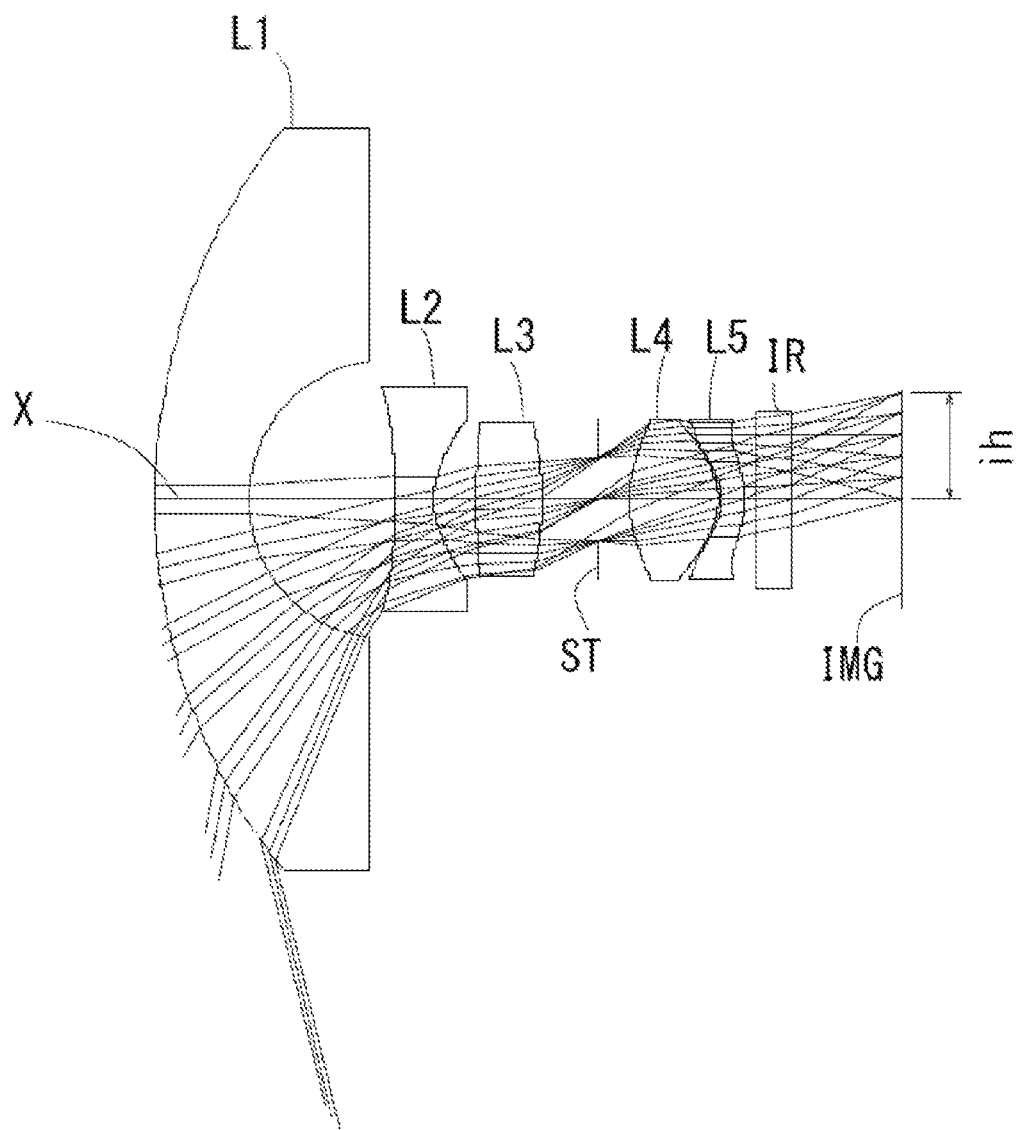
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6 and 8). The distortion diagram shows an amount of deviation from an ideal image height fθ where f denotes a focal length of the overall optical system of the imaging lens, and θ denotes a half field of view. As shown in FIG. 2, each aberration is corrected excellently.

TABLE 1

Example 1
Unit mm f = 1.08    ih = 1.85
Fno = 2.0   TTL = 12.70
ω (°) = 103.1

Surface Data

| Surface Number i | Curvature Radius r | Surface Distance d | Refractive index Nd | Abbe Number vd |
|---|---|---|---|---|
| (Object) | Infinity | Infinity | | |
| 1 | 10.9473 | 1.3948 | 1.773 | 49.61 (vd1) |
| 2 | 2.3756 | 2.5027 | | |
| 3* | 28.0000 | 0.7000 | 1.535 | 56.11 (vd2) |
| 4* | 1.5666 | 0.7921 | | |
| 5 | 30.0000 | 1.0696 | 1.921 | 23.95 (vd3) |
| 6 | −4.6300 | 1.2183 | | |
| 7 (Stop) | Infinity | 0.5329 | | |
| 8* | 2.5433 | 1.3537 | 1.535 | 56.11 (vd4) |
| 9* | −1.0271 | 0.0574 | | |
| 10* | −0.8533 | 0.4000 | 1.661 | 20.37 (vd5) |
| 11* | −1.5567 | 0.2000 | | |
| 12 | Infinity | 0.6100 | 1.517 | 64.17 |
| 13 | Infinity | 2.0724 | | |
| Image Plane | Infinity | | | |

Constituent Lens Data

| Lens | Start Surface | Focal Length |
|---|---|---|
| 1 | 1 | −4.227 |
| 2 | 3 | −3.132 |
| 3 | 5 | 4.420 |
| 4 | 8 | 1.577 |
| 5 | 10 | −3.693 |

Aspheric Surface Data

| | Third Surface | Fourth Surface | Eighth Surface | Ninth Surface | Tenth Surface | Eleventh Surface |
|---|---|---|---|---|---|---|
| k | 0.000000E+00 | 0.000000E+00 | 0.000000E+00 | −5.000000E−01 | −9.450000E−01 | −7.536689E−01 |
| A4 | −3.184689E−02 | −5.726524E−02 | −1.579708E−02 | 1.950291E−01 | 2.371644E−01 | 1.052116E−01 |
| A6 | 7.060004E−03 | 9.183170E−03 | 8.343853E−02 | −1.188862E−01 | −2.059529E−01 | −1.573902E−02 |
| A8 | −1.015862E−03 | −3.780539E−02 | −2.701603E−01 | 1.213196E−01 | 3.070683E−01 | −3.855032E−03 |
| A10 | −9.389348E−05 | 5.539706E−02 | 3.816636E−01 | −5.122357E−02 | −2.391139E−01 | 7.793506E−02 |
| A12 | 5.556759E−05 | −4.483540E−02 | −3.037554E−01 | 1.747603E−03 | 9.720229E−02 | −9.097115E−02 |
| A14 | −5.239444E−06 | 1.755587E−02 | 1.148534E−01 | 3.586992E−03 | −1.630792E−02 | 4.515388E−02 |
| A16 | 0.000000E+00 | −2.770964E−03 | −1.531802E−02 | 0.000000E+00 | 0.000000E+00 | −8.611452E−03 |

Example 2

The basic lens data is shown below in Table 2.

TABLE 2

Example 2
Unit mm f = 1.08   ih = 1.85
Fno = 2.0   TTL = 12.70
ω (°) = 103.6

Surface Data

| Surface Number i | Curvature Radius r | Surface Distance d | Refractive Index Nd | Abbe Number vd |
|---|---|---|---|---|
| (Object) | Infinity | Infinity | | |
| 1 | 10.3462 | 1.6207 | 1.773 | 49.61 (vd1) |
| 2 | 2.4061 | 2.4913 | | |
| 3* | 28.0000 | 0.7000 | 1.535 | 56.11 (vd2) |
| 4* | 1.4819 | 0.7262 | | |
| 5 | 15.0000 | 1.1366 | 1.923 | 20.87 (vd3) |
| 6 | −5.9976 | 0.9787 | | |
| 7 (Stop) | Infinity | 0.5262 | | |
| 8* | 2.2216 | 1.5420 | 1.535 | 56.11 (vd4) |
| 9* | −1.0057 | 0.0500 | | |
| 10* | −0.8951 | 0.4000 | 1.661 | 20.37 (vd5) |
| 11* | −1.6830 | 0.2000 | | |
| 12 | Infinity | 0.6100 | 1.517 | 64.17 |
| 13 | Infinity | 1.9215 | | |
| Image Plane | Infinity | | | |

Constituent Lens Data

| Lens | Start Surface | Focal Length |
|---|---|---|
| 1 | 1 | −4.455 |
| 2 | 3 | −2.953 |
| 3 | 5 | 4.766 |
| 4 | 8 | 1.553 |
| 5 | 10 | −3.626 |

Aspheric Surface Data

| | Third Surface | Fourth Surface | Eighth Surface | Ninth Surface | Tenth Surface | Eleventh Surface |
|---|---|---|---|---|---|---|
| k | 0.000000E+00 | 0.000000E+00 | 0.000000E+00 | −6.000000E−01 | −9.091390E−01 | −6.262823E−01 |
| A4 | −4.378410E−02 | −8.783401E−02 | −8.453853E−03 | 1.606601E−01 | 1.678151E−01 | 8.206727E−02 |
| A6 | 1.628357E−02 | 6.430488E−02 | 1.065343E−02 | 7.718018E−02 | 4.734845E−02 | −8.198620E−03 |
| A8 | −5.139827E−03 | −1.564028E−01 | −3.342274E−02 | −2.104236E−01 | −1.230240E−01 | 4.982409E−02 |
| A10 | 9.986164E−04 | 2.079809E−01 | 1.596764E−02 | 1.962282E−01 | 1.229087E−01 | −5.150573E−02 |
| A12 | −9.486833E−05 | −1.601155E−01 | −2.078143E−03 | −8.190882E−02 | −5.413078E−02 | 3.906853E−02 |
| A14 | 3.155069E−06 | 6.333459E−02 | 0.000000E+00 | 1.337786E−02 | 8.377920E−03 | −1.612314E−02 |
| A16 | 0.000000E+00 | −1.025275E−02 | 0.000000E+00 | 0.000000E+00 | 0.000000E+00 | 2.368828E−03 |

The imaging lens in Example 2 satisfies conditional expressions (1) to (17) as shown in Table 5.

Figure 4:
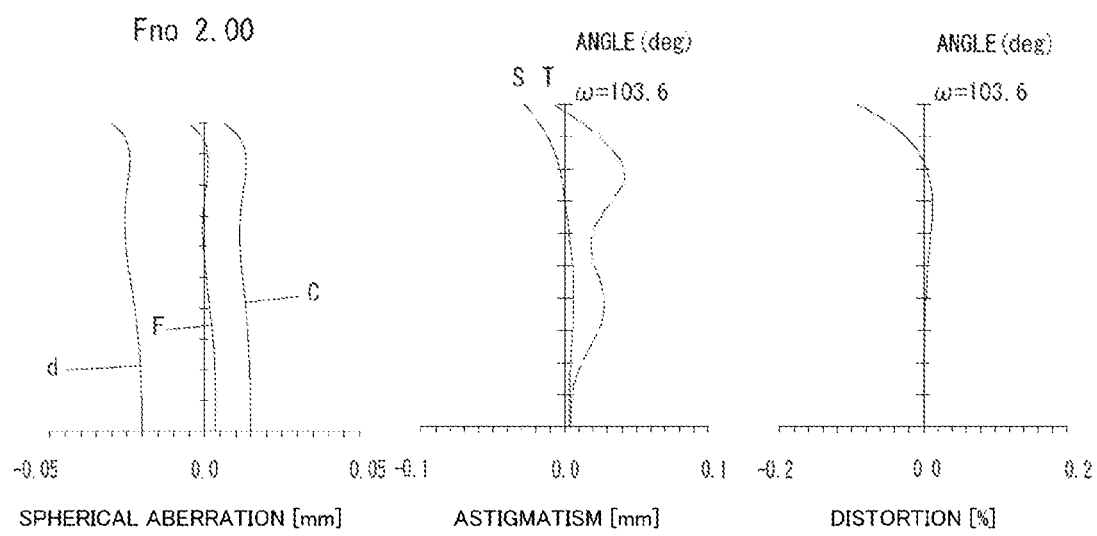
FIG. 4 shows spherical aberration, astigmatism, and distortion of the imaging lens in Example 2 according to the present invention.
Figure 5:
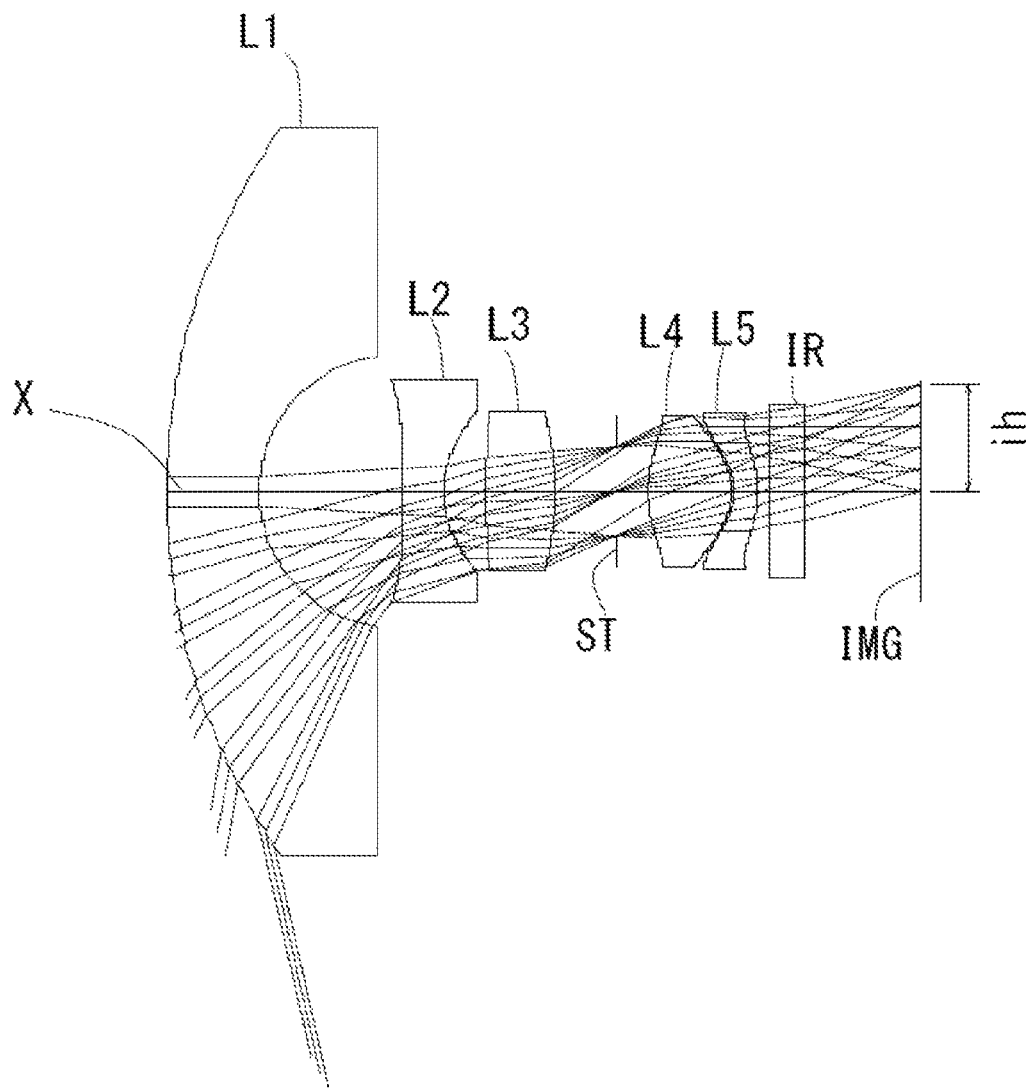
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm f = 1.09   ih = 1.85
Fno = 2.0   TTL = 12.69
ω (°) = 103.0

Surface Data

| Surface Number i | Curvature Radius r | Surface Distance d | Refractive index Nd | Abbe Number vd |
|---|---|---|---|---|
| (Object) | Infinity | Infinity | | |
| 1 | 10.8693 | 1.5784 | 1.773 | 49.61 (vd1) |
| 2 | 2.3321 | 2.4507 | | |
| 3* | 28.0000 | 0.7000 | 1.535 | 56.11 (vd2) |
| 4* | 1.4945 | 0.7363 | | |
| 5 | 15.0000 | 1.1771 | 1.921 | 23.95 (vd3) |
| 6 | −5.0429 | 1.0395 | | |
| 7 (Stop) | Infinity | 0.5554 | | |
| 8* | 2.4566 | 1.4223 | 1.535 | 56.11 (vd4) |
| 9* | −0.9795 | 0.0500 | | |
| 10* | −0.8697 | 0.4000 | 1.661 | 20.37 (vd5) |
| 11* | −1.6934 | 0.2000 | | |
| 12 | Infinity | 0.6100 | 1.517 | 64.17 |
| 13 | Infinity | 1.9801 | | |
| Image Plane | Infinity | | | |

Constituent Lens Data

| Lens | Start Surface | Focal Length |
|---|---|---|
| 1 | 1 | −4.180 |
| 2 | 3 | −2.980 |
| 3 | 5 | 4.216 |
| 4 | 8 | 1.530 |
| 5 | 10 | −3.355 |

Aspheric Surface Data

| | Third Surface | Fourth Surface | Eighth Surface | Ninth Surface | Tenth Surface | Eleventh Surface |
|---|---|---|---|---|---|---|
| k | 0.000000E+00 | 0.000000E+00 | 0.000000E+00 | −6.000000E−01 | −9.240279E−01 | −5.971269E−01 |
| A4 | −3.911302E−02 | −7.765487E−02 | 2.245820E−03 | 1.951324E−01 | 1.980397E−01 | 8.490239E−02 |
| A6 | 1.041511E−02 | 4.429496E−02 | −1.320357E−02 | −7.969125E−02 | −1.003997E−01 | −1.517091E−02 |
| A8 | −1.415962E−03 | −1.132025E−01 | −6.849677E−04 | 6.331840E−02 | 1.395869E−01 | 4.481158E−02 |
| A10 | −3.014215E−04 | 1.526696E−01 | −1.080274E−02 | −2.788741E−02 | −9.640108E−02 | −2.579547E−02 |
| A12 | 1.354567E−04 | −1.186988E−01 | 3.832315E−03 | 5.472374E−03 | 3.454258E−02 | 9.553831E−03 |
| A14 | −1.321812E−05 | 4.690625E−02 | 0.000000E+00 | 1.159475E−04 | −5.345426E−03 | −1.952377E−03 |
| A16 | 0.000000E+00 | −7.587189E−03 | 0.000000E+00 | 0.000000E+00 | 0.000000E+00 | −6.293644E−05 |

The imaging lens in Example 3 satisfies conditional expressions (1) to (17) as shown in Table 5.

Figure 6:
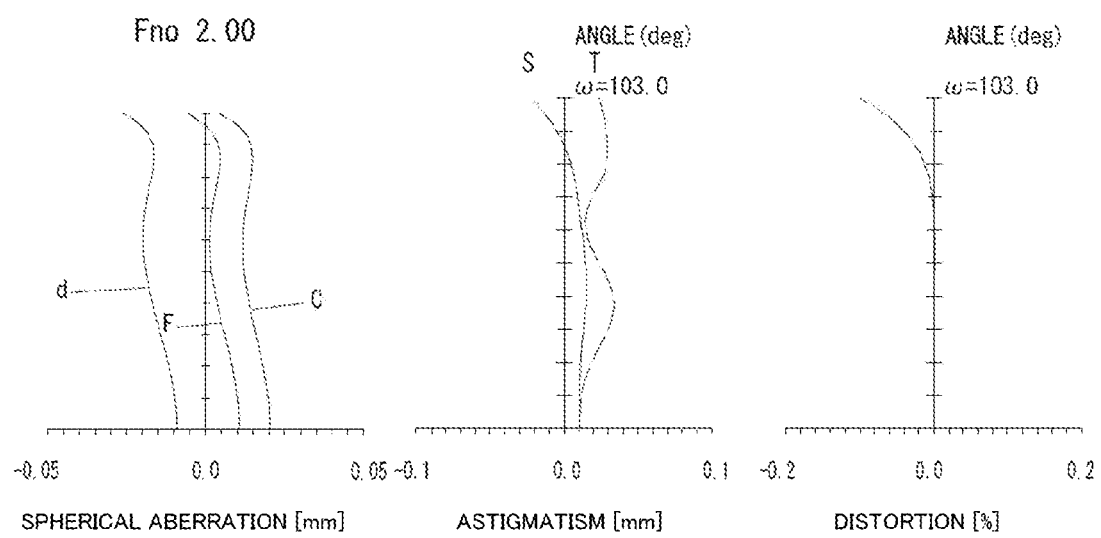
FIG. 6 shows spherical aberration, astigmatism, and distortion of the imaging lens in Example 3 according to the present invention.
Figure 7:
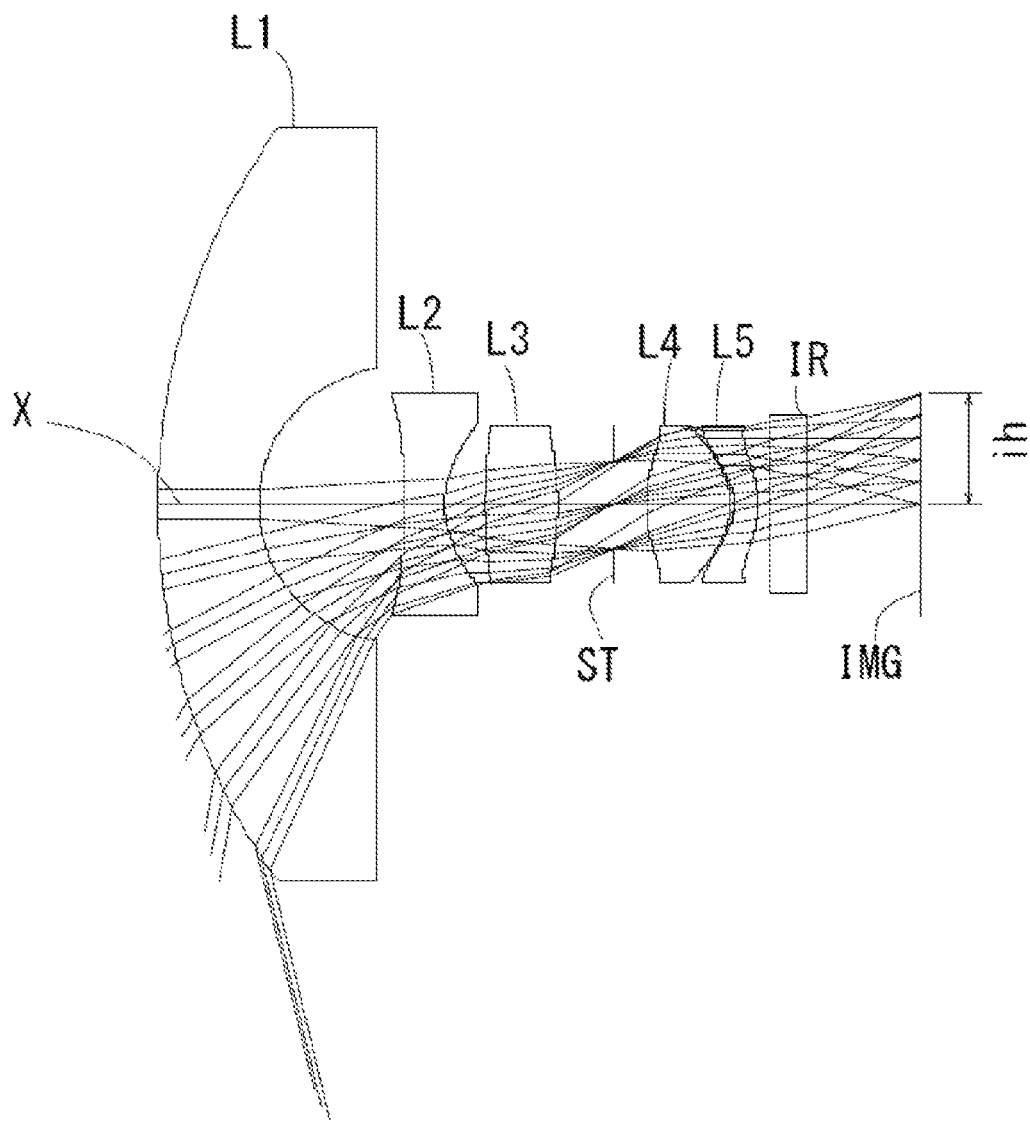
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm f = 1.10          ih = 1.85
Fno = 2.0         TTL = 12.69
ω (°) = 103.5

Surface Data

| Surface Number i | Curvature Radius r | Surface Distance d | Refradive Index Nd | Abbe Number vd |
|---|---|---|---|---|
| (Object) | Infinity | Infinity | | |
| 1 | 10.9939 | 1.7093 | 1.773 | 49.61 (vd1) |
| 2 | 2.3146 | 2.4459 | | |
| 3* | 28.0000 | 0.7000 | 1.535 | 56.11 (vd2) |
| 4* | 1.4639 | 0.6923 | | |
| 5 | 10.0000 | 1.2251 | 1.921 | 23.95 (vd3) |
| 6 | −5.4746 | 0.9526 | | |
| 7 (Stop) | Infinity | 0.5534 | | |
| 8* | 2.4526 | 1.4351 | 1.535 | 56.11 (vd4) |
| 9* | −0.9719 | 0.0500 | | |
| 10* | −0.8747 | 0.4000 | 1.661 | 20.37 (vd5) |
| 11* | −1.7068 | 0.2000 | | |
| 12 | Infinity | 0.6100 | 1.517 | 64.17 |
| 13 | Infinity | 1.9288 | | |
| Image Plane | Infinity | | | |

Constituent Lens Data

| Lens | Start Surface | Focal Length |
|---|---|---|
| 1 | 1 | −4.152 |
| 2 | 3 | −2.916 |
| 3 | 5 | 3.992 |
| 4 | 8 | 1.524 |
| 5 | 10 | −3.358 |

Aspheric Surface Data

| | Third Surface | Fourth Surface | Eighth Surface | Ninth Surface | Tenth Surface | Eleventh Surface |
|---|---|---|---|---|---|---|
| k | 0.000000E+00 | 0.000000E+00 | 0.000000E+00 | −6.138031E−01 | −9.152282E−01 | −5.327844E−01 |
| A4 | −5.082356E−02 | −9.627426E−02 | 2.510352E−03 | 2.235117E−01 | 2.075226E−01 | 7.351707E−02 |
| A6 | 1.777444E−02 | 6.549374E−02 | −1.483589E−02 | −1.521749E−01 | −1.600989E−01 | −9.952516E−03 |
| A8 | −4.110065E−03 | −1.563970E−01 | 5.027399E−03 | 1.546808E−01 | 2.329474E−01 | 3.833259E−02 |
| A10 | 3.493330E−04 | 2.167895E−01 | −1.533507E−02 | −8.976253E−02 | −1.664300E−01 | −1.123927E−02 |
| A12 | 4.412087E−05 | −1.722172E−01 | 5.059361E−03 | 2.687672E−02 | 6.082811E−02 | −5.114294E−03 |
| A14 | −7.720963E−06 | 6.959889E−02 | 0.000000E+00 | −2.893949E−03 | −9.278886E−03 | 4.933013E−03 |
| A16 | 0.000000E+00 | −1.150863E−02 | 0.000000E+00 | 0.000000E+00 | 0.000000E+00 | −1.282151E−03 |

The imaging lens in Example 4 satisfies conditional expressions (1) to (17) as shown in Table 5.

Figure 8:
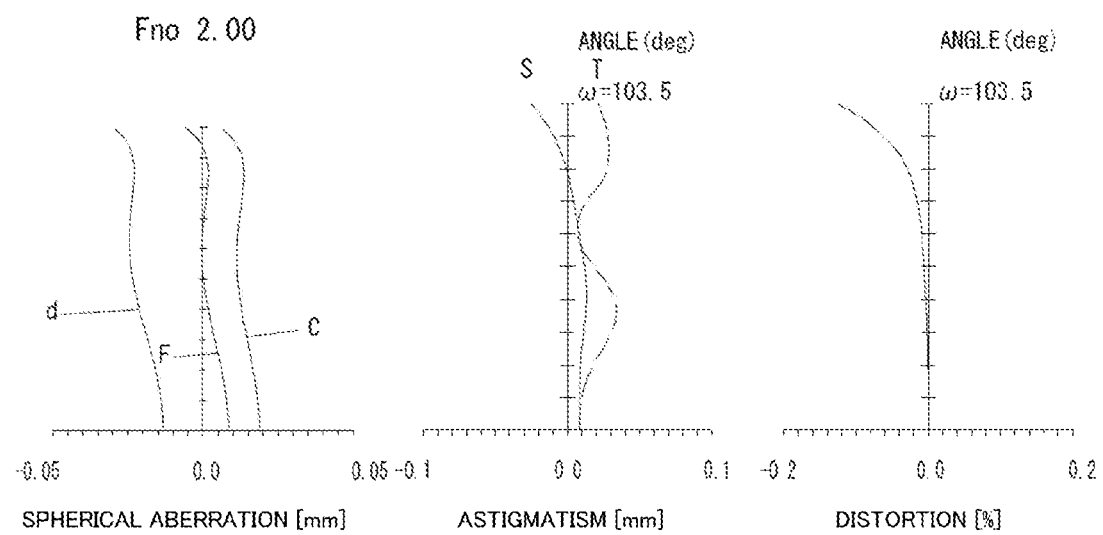
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

In table 5, values of conditional expressions (1) to (17) related to the Examples 1 to 4 are shown.

TABLE 5

| | Conditional expression | Example 1 | Example 2 | Example 3 | Example 4 |
|---|---|---|---|---|---|
| (1) | (T4/f) × 100 | 5.29 | 4.65 | 4.60 | 4.55 |
| (2) | f2/f5 | 0.85 | 0.81 | 0.89 | 0.87 |

TABLE 5-continued

| | Conditional expression | Example 1 | Example 2 | Example 3 | Example 4 |
|---|---|---|---|---|---|
| (3) | T1/f | 2.31 | 2.31 | 2.25 | 2.23 |
| (4) | T2/T3 | 0.45 | 0.48 | 0.46 | 0.46 |
| (5) | (D5/f5) × 100 | −10.83 | −11.03 | −11.92 | −11.91 |
| (6) | T2/f | 0.73 | 0.67 | 0.68 | 0.63 |
| (7) | T1/T2 | 3.16 | 3.43 | 3.33 | 3.53 |

TABLE 5-continued

| | Conditional expression | Example 1 | Example 2 | Example 3 | Example 4 |
|---|---|---|---|---|---|
| (8) | D1/D2 | 1.99 | 2.32 | 2.25 | 2.44 |
| (9) | r3/f | 25.84 | 26.02 | 25.73 | 25.49 |
| (10) | r5/f | 27.69 | 13.94 | 13.79 | 9.10 |
| (11) | r6/f | −4.27 | −5.57 | −4.63 | −4.98 |
| (12) | (D1/f1) × 100 | −33.00 | −36.38 | −37.76 | −41.17 |
| (13) | r3/r4 | 17.87 | 18.90 | 18.74 | 19.13 |
| (14) | r7/r8 | −2.48 | −2.21 | −2.51 | −2.52 |
| (15) | f1/f | −3.90 | −4.14 | −3.84 | −3.78 |
| (16) | f2/f | −2.89 | −2.74 | −2.74 | −2.65 |
| (17) | f5/f | −3.41 | −3.37 | −3.08 | −3.06 |

When the imaging lens according to the present invention is adopted to a product with the camera function, there is realized contribution to the wide field of view, the low-profileness and the low F-number of the camera, and high performance thereof.

DESCRIPTION OF REFERENCE NUMERALS

ST: aperture stop
L1: first lens
L2: second lens
L3: third lens
L4: fourth lens
L5: fifth lens
ih: maximum image height
IR: filter
IMG: imaging plane

What is claimed is:

1. An imaging lens comprising in order from an object side to an image side,
   a first lens,
   a second lens having negative refractive power near the optical axis,
   a third lens having a convex surface facing the image side near the optical axis,
   a fourth lens, and
   a fifth lens, wherein said first lens has negative refractive power near the optical axis, an image-side surface of said fifth lens has a convex surface facing the image side near the optical axis, and below conditional expressions (1), (2) and (8) are satisfied:

$$3.00 < (T4/f) \times 100 < 5.90 \tag{1}$$

$$0.40 < f2/f5 < 1.45 \tag{2}$$

$$1.20 < D1/D2 < 3.70 \tag{8}$$

where
T4: a distance along the optical axis from the image-side surface of the fourth lens to the object-side surface of the fifth lens,
f: a focal length of the overall optical system of the imaging lens,
f2: a focal length of the second lens,
f5: a focal length of the fifth lens,
D1: a thickness along the optical axis of the first lens, and
D2: a thickness along the optical axis of the second lens.

2. The imaging lens according to claim 1, wherein a below conditional expression (7) is satisfied:

$$1.50 < T1/T2 < 5.30 \tag{7}$$

where
T1: a distance along the optical axis from the image-side surface of the first lens to the object-side surface of the second lens, and
T2: a distance along the optical axis from the image-side surface of the second lens to the object-side surface of the third lens.

3. The imaging lens according to claim 1, wherein a below conditional expression (11) is satisfied:

$$-8.50 < r6/f < -2.00 \tag{11}$$

where
r6: a paraxial curvature radius of the image-side surface of the third lens, and
f: a focal length of the overall optical system of the imaging lens.

4. The imaging lens according to claim 1, wherein a below conditional expression (12) is satisfied:

$$-62 < (D1/f1) \times 100 < -29 \tag{12}$$

where
D1: a thickness along the optical axis of the first lens, and
f1: a focal length of the first lens.

5. An imaging lens comprising in order from an object side to an image side,
   a first lens,
   a second lens having negative refractive power near the optical axis,
   a third lens having a convex surface facing the image side near the optical axis,
   a fourth lens, and
   a fifth lens, wherein said imaging lens is configured with only five lenses, with the lenses configured so that none of the adjacent pairs of the five lenses is cemented, said first lens has negative refractive power near the optical axis, an object-side surface of said second lens has a convex surface facing the object side near the optical axis, an object-side surface of said fifth lens has a concave surface facing the object side near the optical axis, and below conditional expressions (3) and (4) are satisfied:

$$1.60 < T1/f < 3.70 \tag{3}$$

$$0.10 < T2/T3 < 0.80 \tag{4}$$

where
T1: a distance along the optical axis from the image-side surface of the first lens to the object-side surface of the second lens,
f: a focal length of the overall optical system of the imaging lens,
T2: a distance along the optical axis from the image-side surface of the second lens to the object-side surface of the third lens, and
T3: a distance along the optical axis from the image-side surface of the third lens to the object-side surface of the fourth lens.

6. The imaging lens according to claim 5, wherein an image-side surface of said fifth lens has a convex surface facing the image side near the optical axis.

7. The imaging lens according to claim 5, wherein a below conditional expression (6) is satisfied:

$$0.30 < T2/f < 1.00 \tag{6}$$

where
T2: a distance along the optical axis from the image-side surface of the second lens to the object-side surface of the third lens, and
f: a focal length of the overall optical system of the imaging lens.

8. The imaging lens according to claim 5, wherein a below conditional expression (1) is satisfied:

$$3.00 < (T4/f) \times 100 < 5.90 \tag{1}$$

where
T4: a distance along the optical axis from the image-side surface of the fourth lens to the object-side surface of the fifth lens, and
f: a focal length of the overall optical system of the imaging lens.

9. The imaging lens according to claim 5, wherein a below conditional expression (9) is satisfied:

$$12 < r3/f < 40 \tag{9}$$

where
r3: a paraxial curvature radius of the object-side surface of the second lens, and
f: a focal length of the overall optical system of the imaging lens.

10. The imaging lens according to claim 2, wherein a below conditional expression (10) is satisfied:

$$6.50 < r5/f < 42.00 \tag{10}$$

where
r5: a paraxial curvature radius of the object-side surface of the third lens, and
f: a focal length of the overall optical system of the imaging lens.

11. The imaging lens according to claim 5, wherein a below conditional expression (8) is satisfied:

$$1.20 < D1/D2 < 3.70 \tag{8}$$

where
D1: a thickness along the optical axis of the first lens, and
D2: a thickness along the optical axis of the second lens.

12. The imaging lens according to claim 2, wherein a below conditional expression (12) is satisfied:

$$-62 < (D1/f1) \times 100 < -29 \tag{12}$$

where
D1: a thickness along the optical axis of the first lens, and
f1: a focal length of the first lens.

13. An imaging lens comprising in order from an object side to an image side,
a first lens,
a second lens having negative refractive power near the optical axis,
a third lens having a convex surface facing the image side near the optical axis,
a fourth lens, and
a fifth lens, wherein an object-side surface of said second lens has a convex surface facing the object side near the optical axis, an image-side surface of said fifth lens has a convex surface facing the image side near the optical axis, and below conditional expressions (1), (3), and (5) are satisfied:

$$3.00 < (T4/f) \times 100 < 5.90 \tag{1}$$

$$1.60 < T1/f < 3.70 \tag{3}$$

$$-19.5 < (D5/f5) \times 100 < -9.00 \tag{5}$$

where
T4: a distance along the optical axis from the image-side surface of the fourth lens to the object-side surface of the fifth lens,
f: a focal length of the overall optical system of the imaging lens,
T1: a distance along the optical axis from the image-side surface of the first lens to the object-side surface of the second lens
D5: a thickness along the optical axis of the fifth lens, and
f5: a focal length of the fifth lens.

14. The imaging lens according to claim 13, wherein said first lens has negative refractive power near the optical axis.

15. The imaging lens according to claim 13, wherein a below conditional expression (7) is satisfied:

$$1.50 < T1/T2 < 5.30 \tag{7}$$

where
T1: a distance along the optical axis from the image-side surface of the first lens to the object-side surface of the second lens, and
T2: a distance along the optical axis from the image-side surface of the second lens to the object-side surface of the third lens.

16. The imaging lens according to claim 13, wherein a below conditional expression (10) is satisfied:

$$6.50 < r5/f < 42.00 \tag{10}$$

where
r5: a paraxial curvature radius of the object-side surface of the third lens, and
f: a focal length of the overall optical system of the imaging lens.

17. The imaging lens according to claim 13, wherein a below conditional expression (12) is satisfied:

$$-62 < (D1/f1) \times 100 < -29 \tag{12}$$

where
D1: a thickness along the optical axis of the first lens, and
f1: a focal length of the first lens.

* * * * *